United States Patent [19]

Watanabe et al.

[11] Patent Number: 4,521,570

[45] Date of Patent: Jun. 4, 1985

[54] MODIFIED EPOXY RESIN AND COMPOSITION

[75] Inventors: Shoji Watanabe; Kimio Inoue; Kiyoshi Okitsu, all of Ohtake, Japan

[73] Assignee: Daicel Chemical Industries, Ltd., Osaka, Japan

[21] Appl. No.: 583,794

[22] Filed: Mar. 1, 1984

Related U.S. Application Data

[63] Continuation of Ser. No. 385,211, Jun. 4, 1982, abandoned.

[30] Foreign Application Priority Data

Jun. 19, 1981 [JP] Japan .................................. 56-94876
Aug. 20, 1981 [JP] Japan ................................ 56-131377

[51] Int. Cl.$^3$ .............................................. C08L 67/04
[52] U.S. Cl. ..................................... 525/415; 525/533
[58] Field of Search ................................ 525/415, 533

[56] References Cited

U.S. PATENT DOCUMENTS 3,203,920  8/1965  Nikles et al. .......................... 525/533
3,222,312 12/1965  Wyart et al. .......................... 525/533
3,382,210  5/1968  Wyart et al. .......................... 525/533
4,086,294  4/1978  Koleske et al. ....................... 525/415

Primary Examiner—John C. Bleutge
Assistant Examiner—Robert E. L. Sellers, II
Attorney, Agent, or Firm—Flynn, Thiel, Boutell and Tanis

[57] ABSTRACT

An epoxy resin having hydroxyl groups is modified with $\epsilon$-caprolactone by effecting the ring opening polymerization of $\epsilon$-caprolactone onto the hydroxyl groups contained in the epoxy resin. The modified epoxy resin is further combined with a polycarboxylic anhydride and a promotor for curing, or polyamine to give a curable composition. The modified epoxy resin is further modified by reacting the epoxy groups therein with a primary or secondary amine. Both the modified resin and the compositions are useful as coating.

11 Claims, No Drawings

4,521,570

MODIFIED EPOXY RESIN AND COMPOSITION

This application is a continuation of U.S. Ser. No. 385,211, filed 6/4/82, now abandoned.

BACKGROUND OF THE INVENTION

1. Field of the Invention

The present invention relates to a modified epoxy resin having an excellent flexibility and containing a primary hydroxyl group excellent in the reactivity with a crosslinking agent, which is obtained by ring-opening polymerization of $\epsilon$-caprolactone with the secondary hydroxyl group of an epoxy resin.

The present invention relates to a curable epoxy resin composition which comprises an epoxy resin internally plasticized with caprolactone, a polycarboxylic acid anhydride, and a curing promoter, and which cures to form highly flexible articles.

The present invention relates to a curable epoxy resin composition which comprises an epoxy resin internally plasticized with caprolactone and a polyamine, and which cures to form highly flexible articles.

The present invention relates a process for preparing a novel coating polyol resin excellent in flexibility reactivity with a crosslinking agent and the property of providing a coating having a high corrosion resistance by subjecting to ring-opening polymerization of secondary hydroxyl groups of a hydroxyl group-containing epoxy resin with $\epsilon$-caprolactone and modifying the epoxy groups of the epoxy resin with an amine.

2. Description of Prior Arts

The class of epoxy resins, especially a glycidyl ether type epoxy resin prepared from bisphenol A and epichlorohydrin, includes a great variety of kinds ranging from a liquid resin to a solid resin having a high molecular weight, and this class of resins is widely used in various fields.

A liquid resin having a low molecular weight has a high reactivity in the epoxy group, and by utilizing this property, the resin is cured at normal temperatures with a polyamine or polyamide resin and used as an adhesive, FRP or a flooring material. Moreover, the liquid epoxy resin is heated and cured with a polybasic acid anhydride for the manufacture of cast products especially in the electric industry. On the other hand, a product having a high molecular weight is a brittle solid resin having a melting point of 60° to 150° C., and since this resin contains not only terminal epoxy groups but also secondary hydroxyl groups, it is widely used in the field of coating by utilizing the reactivity of these hydroxyl groups. For example, an epoxy ester obtained by esterification of this solid resin with an unsaturated fatty acid is used as an air-drying or normal temperature-drying paint. Furthermore, this epoxy resin is used as a baking paint including a melamine resin as a crosslinking agent or as a can-coating paint while being combined with a phenolic resin.

Moreover, this solid epoxy resin is powdered and mixed with a blocked isocyanate and is used as an epoxy type powder paint, or it is used for the cationic electrostatic coating.

Although the solid epoxy resin is used in various fields, since the resin is hard and brittle and the hydroxyl group is a secondary hydroxyl group, the reactivity with a crosslinking agent to be reacted with the hydroxyl group is poor and a high temperature is required for baking and crosslinking. Moreover, this epoxy resin is defective in that the weatherability is poor.

We made researches with a view to eliminating these defects of an epoxy resin and further broadening the possibility of using the epoxy resin, and we found that an appropriate flexibility is given to a hard and brittle epoxy resin by ring-opening polymerization of $\epsilon$-caprolactone with the secondary hydroxyl group of the epoxy resin and simultaneously, the secondary hydroxyl group which is poor in the reactivity is converted to a primary hydroxyl group of the polycaprolactone having a high reactivity, and that in this modified epoxy resin, since the primary hydroxyl group is present at a point separate from the rigid epoxy resin skeleton, the reaction with a crosslinking agent is accelerated. We have now completed the present invention based on these findings.

It is well known to heat-cure an epoxy resin incorporated with a polycarboxylic acid anhydride with a curing promoter such as amines. The cured articles are, in general, superior in chemical, mechanical, and thermal properties, and find use as electrical parts and other articles in many industrial fields. They, however, are very hard, lacking flexibility, and are greatly strained by cure shrinkage. Many attempts have been made to overcome the disadvantage of the lack of flexibility. For example, it has been attempted to incorporate epoxy resins with a flexibilizer such as polybutadiene oligomers having carboxyl groups at both terminals, polyester resins having carboxyl groups, polyether resins having hydroxyl groups, polyester resins, and polyamide resins, or with a flexible epoxy resin like glycidyl ether which is prepared from polyether polyol and epichlorohydrin.

The above-mentioned attempts, however, are not necessarily successful because the resulting epoxy resins are poor in heat resistance, chemical resistance, and mechanical strength.

In order to develop a curable epoxy resin composition which is superior in flexibility, the present inventors carried out a series of studies which led to the findings that this object can be achieved by heat-curing caprolactone-modified epoxy resin and polycarboxylic acid anhydride with a curing promoter. The present invention is based on these findings.

It is well known to cure at room temperature or heat-cure an epoxy resin incorporated with a polyamine. The cured articles are, in general, superior in chemical, mechanical, and thermal properties, and find use as electrical parts, adhesives, and other articles in many industrial fields. They, however, are very hard, lacking flexibility, and are greatly strained by cure shrinkage. Many attempts have been made to impart flexibility. For example, it has been attempted to incorporate epoxy resins with a flexibilizer such as polybutadiene oligomers having carboxyl groups or hydroxyl groups at both terminals, polyester resins having carboxyl groups, polyether resins having hydroxyl groups, and polyester resins, or with a flexible epoxy resin like glycidyl ether which is prepared from polyether polyol and epichlorohydrin.

The above-mentioned attempts, however, are not necessarily successful because the resulting epoxy resins are poor in heat resistance, chemical resistance, and mechanical strength.

In order to develop a curable epoxy resin composition which is superior in flexibility, the present inventors carried out a series of studies which led to the findings that this object can be achieved by curing at room temperature or heat curing a caprolactone-modified epoxy resin with a polyamine. The present invention is based on these findings.

The class of epoxy resins, especially a glycidyl ether type epoxy resin prepared from bisphenol A and epichlorohydrin, includes a great variety of kinds ranging from a liquid resin to a solid resin having a high molecular weight, and this class of resins is widely used in various fields.

A liquid resin having a low molecular weight has a high reactivity in the epoxy group, and by utilizing this property, the resin is cured at normal temperatures with a polyamine or polyamide resin and used as an adhesive, FRP, a flooring material or an anti-corrosive paint. Moreover, the liquid epoxy resin is heated and cured with a polybasic acid anhydride for the manufacture of cast products especially in the electric industry. On the other hand, a product having a high molecular weight is a brittle solid resin having a melting point of 60° to 150° C., and it is widely used as a powdery casting resin in the electric industry by reacting it with an epoxy curing agent such as a polyamine, dicyane diamide, an imidazole or an acid anhydride. Furthermore, it is widely used in the field of coating by utilizing the reactivity of hydroxyl groups. For example, the solid epoxy resin is added to a melamine alkyd type baking paint so as to improve the corrosion resistance and adhesion. Moreover, an epoxy ester obtained by esterification of this solid resin with a fatty acid is used as a normal temperature-drying paint. Furthermore, this epoxy resin is used as a baking paint including a melamine resin as a crosslinking agent or as a can-coating paint while being combined with a phenolic resin.

Moreover, this solid epoxy resin is powdered and mixed with a blocked isocyanate and is used as an epoxy type powder paint, or it is used for the cationic electrostatic coating after the epoxy groups have been aminated and rendered water-soluble.

Although the solid epoxy resin is used in various fields, since the resin is hard and brittle and the hydroxyl group is a secondary hydroxyl group, the reactivity with a crosslinking agent to be reacted with the hydroxyl group is poor and a high temperature is required for baking and crosslinking. Moreover, this epoxy resin is defective in that the weatherability is poor or yellowing or chalking is caused.

We made researches with a view to eliminating these defects of an epoxy resin and further broadening the possibility of using the epoxy resin, and we found that an appropriate flexibility is given to a hard and brittle epoxy resin by ring-opening polymerizing of ε-caprolactone onto the secondary hydroxyl group of the epoxy resin and further modifying both terminal epoxy groups of the epoxy resin with an amine having an active hydrogen atom. In this way, the secondary hydroxyl group which is poor in the reactivity is converted to a primary hydroxyl group of the polycaprolactone having a high reactivity. In this modified epoxy resin, since the primary hydroxyl group is present at a point separate from the rigid epoxy resin skeleton, the reaction with a crosslinking agent is accelerated. Furthermore, it was found that since the epoxy resin is modified with an amine, the adhesion to a coated article and the corrosion resistance are highly improved. We have now completed the present invention based on these findings.

SUMMARY OF THE INVENTION

More specifically, in accordance with the present invention, there is provided a lactone-modified epoxy resin obtained by reacting 97-5 parts by weight of a hydroxyl group-containing epoxy resin with 3-95 parts by weight of ε-caprolactone to effect ring-opening polymerization of ε-caprolactone with the hydroxyl group of the epoxy resin.

As means for imparting a flexibility to an epoxy resin, there has been adopted a method in which the epoxy resin is esterified with a long-chain fatty acid. However, in this modified resin, it is still a secondary hydroxyl group that reacts with a crosslinking agent, and the number of the hydroxyl groups is reduced as a result of the esterification.

Further a method has been adopted in which the epoxy resin is modified with a polyester polyol, polycaprolactone polyol or polyamide resin having a flexibility by utilizing the terminal epoxy group of the epoxy resin. However, in this modified resin, it is still a secondary hydroxyl group having a poor reactivity that is used for the crosslinking reaction.

Since the resin of the present invention is differentiated from this modified epoxy resin in that flexibility is imparted to the epoxy resin and simultaneously, a primary hydroxyl group is made present in the epoxy resin, the application range of the epoxy resin is further broadened and furthermore, since the curing reaction with a crosslinking agent is advanced at a temperature lower than the temperature conventionally adaopted for the curing reaction, a high energy-saving effect can be attained.

The lactone-modified epoxy resin used in this invention has polycaprolactone side chains bonded directly to the epoxy resin as the result of ring opening polymerization of ε-caprolactone with hydroxyl groups present in the epoxy resin per se. Therefore, not only is it highly flexible, but also it is superior in heat resistance, water resistance, low-temperature properties, and miscibility which are inherent in polycaprolactone. In the case where epoxy resins are made flexible by adding flexibilizers, the miscibility of the two components often causes a problem. According to the present invention, it is possible to modify any epoxy resins with ε-caprolactone so long as the epoxy resins have hydroxyl groups. The present invention is very useful in that it enables one to impart flexibility to curable epoxy resin compositions which are used in every industrial area.

The epoxy resin which is used for producing the lactone-modified epoxy resin according to the present invention can be any epoxy resin so long as it contains hydroxyl groups. Examples of such epoxy resins include bisphenol A diglycidyl ether represented by the following formula (I) which is produced from bisphenol A and epichlorohydrin,

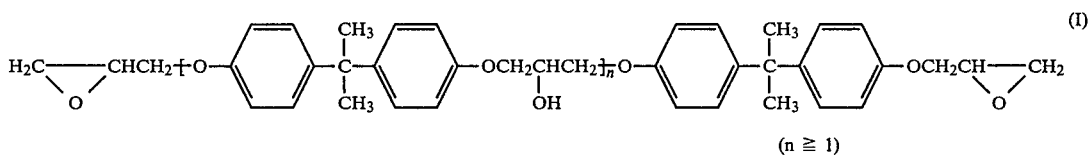

(n ≧ 1)

an epoxy resin represented by the following formula (II) which is produced from bisphenol A and β-methylepichlorohydrin,

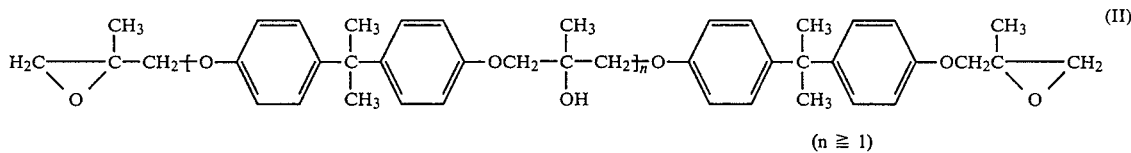

(n ≧ 1)

a flame retardant epoxy resin which is produced from 2,6-dibromobisphenol A and epichlorohydrin or β-methylepichlorohydrin,
an alicyclic epoxy resin represented by the following formula (III),

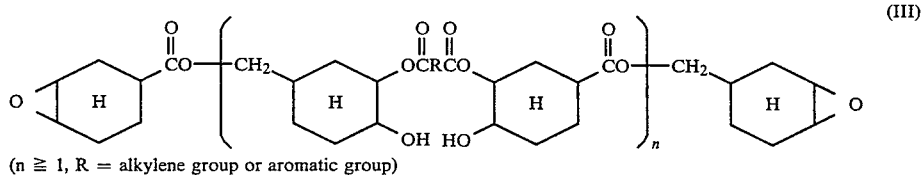

(n ≧ 1, R = alkylene group or aromatic group)

a glycidyl ester represented by the following formula (IV) which is synthesized from dicarboxylic acid and epichlorohydrin,

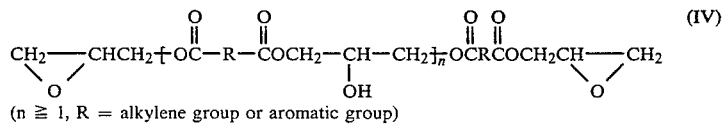

(n ≧ 1, R = alkylene group or aromatic group)

and a glycidyl ether epoxy resin which is produced from bisphenol F (synthesized from formalin and phenol) and epichlorohydrin, which has the following structure:

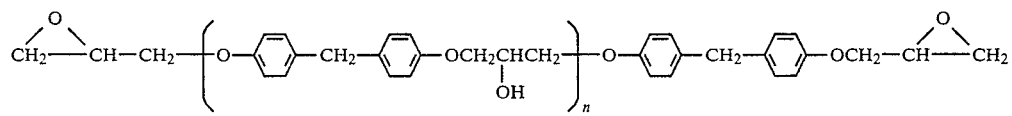

wherein n is a number of at least 1.

The ε-caprolactone to be reacted with the epoxy resins having hydroxyl groups is produced industrially by the Baeyer-Villiger rearrangement of cyclohexanone with a peracid. It is also permitted to copolymerize ε-caprolactone together with cyclic lactone within limits not harmful to the features of this invention.

According to this invention, an epoxy resin and ε-caprolactone are reacted at ratios of 97 to 5 parts by weight for the former and 3 to 95 parts by weight for the latter, preferably 95 to 30 parts by weight for the former and 5 to 70 parts by weight for the latter. If the quantity of ε-caprolactone for modification is too small, the resulting cured articles are not sufficiently flexible, and if it is too much, the cured articles are excessively flexible.

The reaction of epoxy resin and ε-caprolactone are performed at 100° to 240° C., preferably 120° to 200° C., in the presence of catalyst. If the reaction temperature is lower than 100° C., the reaction rate is slow, and if it is higher than 240° C., ε-caprolactone boils to escape from the reaction system. A catalyst is required for ε-caprolactone to be added to the secondary hydroxyl groups of the epoxy resin through the ring opening reaction. Examples of such catalysts include titanium compounds such as tetrabutyl titanate, tetrapropyl titanate, and tetraethyl titanate; organotin compounds such as stannous octoate, dibutyltin oxide, and dibutyltin laurate; and stannous halides such as stannous chloride, stannous bromide, and stannous iodide. The stannous halide is preferable when it is desirable to obtain a product having a narrow molecular weight distribution. The catalyst is used in an amount of 0.01 to 1000 ppm, preferably 0.2 to 500 ppm, depending on the reaction temperature.

The reaction may be performed without a solvent or in a solvent such as toluene and xylene having no active hydrogen. Any solvent having ester bonds is not preferable, because an ester interchange reaction takes place in the reaction between the ester bond of the polycaprolactone chain and the solvent, forming polycaprolactone which is not connected to the epoxy resin.

When stannous chloride is used as the catalyst, an ester exchange reaction is not substantially caused and hence, an ester type solvent may be used. However, when a titanium type catalyst is used, an ester exchange reaction is promoted, and it is preferred that the use of an ester type solvent be avoided.

Since the so-obtained lactone-modified epoxy resin contains primary hydroxyl groups having a high reactivity, the resin may be used as a crosslinking type coating agent by mixing it with an isocyanate, an amino resin such melamine or a phenolic resin.

Moreover, the modified epoxy resin may be used as a powder paint by mixing it with a blocked isocyanate. Furthermore, the lactone-modified resin may be added to conventional epoxy resins so as to improve the flexibility or reactivity. Still further, the modified resin may be used for production of an aqueous resin by reacting the epoxy groups left on both the molecule ends of the resin with an amine and then performing neutralization. An aqueous baking paint or electrostatic coating paint may be prepared by mixing this aqueous resin with a melamine resin as a water-soluble curing agent or with a blocked isocyanate.

Furthermore, an epoxy acrylate resin synthesized by reacting both the terminal epoxy groups of the resin of the present invention with acrylic acid or methacrylic acid may be mixed with a radical initiator or photosensitizer to form a photo-curable or radical-curable resin which is used for FRP, a photo-curable paint, an ink or an adhesive.

Thus, the present invention relates to a curable epoxy resin composition which comprises lactone-modified epoxy resin, and polycarboxylic acid anhydride and curing promoter blended therein, said epoxy resin being obtained by ring opening polymerization of 3 to 95 parts by weight of ε-caprolactone with the hydroxyl groups of 97 to 5 parts by weight of epoxy resin having hydroxyl groups.

The polycarboxylic acid anhydride used for the curable composition of this invention is not specifically limited; commonly used ones are phthalic anhydride, (methyl)tetrahydrophthalic anhydride, (methyl)hexahydrophthalic anhydride, methyl nadic anhydride, chlorendic anhydride, trimellitic anhydride, pyromellitic anhydride, and dodecenylsuccinic anhydride. They are used in an amount of 0.5 to 1.0 equivalent for one equivalent of epoxy group.

The curing promoter is not specifically limited so long as it has a catalytic action. Commonly used ones are tertiary amines such as benzyldimethylamine, benzyldiethylamine, cyclohexyldimethylamine, and tris(dimethylaminomethyl)phenol. They are used in an amount of 0.05 to 5.0 parts by weight for 100 parts by weight of epoxy resin.

Thus, the present invention relates to a curable epoxy resin composition which comprises a lactone-modified epoxy resin and a polyamine blended therein, said epoxy resin being obtained by polymerization of 3 to 95 parts by weight of ε-caprolactone with the hydroxyl groups of 97 to 5 parts by weight of epoxy resin having hydroxyl groups.

The polyamine used for the curable composition of this invention is not specifically limited; commonly used ones are aliphatic polyamines such as ethylenediamine, diethylenetriamine, triethylenetetramine, menthenediamine, m-xylylenediamine, and N-aminoethylpiperazine; aromatic polyamines such as m-phenylenediamine, diaminodiphenylmethane, and diaminodiphenylsulfone; melamine resin; urea resin; and imidazole amino acid. They are used in an amount of 0.1 to 3.0 equivalent for one equivalent of epoxy group.

In addition, it is also possible to add compounds that promote curing, such as water, and alcohols, carboxylic acids, primary amines, and secondary amines having active hydrogen. The composition of this invention may be incorporated with a filler of inorganic compound such as alumina and silica.

Further, the curable epoxy resin composition of this invention may be incorporated with any flexibilizer known to the industry such as butane-acrylonitrile copolymer oligomer, polybutadiene dicarboxylic acid, polycaprolactone, dimer acid, and polyether polyol.

More specifically, in accordance with the present invention, there is provided a process for the preparation of coating polyol resins, which comprises partially or totally reacting epoxy groups of a lactone-modified epoxy resin obtained by reacting 97–5 parts by weight of a hydroxyl group-containing epoxy resin with 3–95 parts by weight of ε-caprolactone to effect ring-opening polymerization of the hydroxyl groups of the epoxy resin with ε-caprolactone, with a primary or secondary amine.

As means for imparting a flexibility to an epoxy resin, there has been adopted a method in which the epoxy resin is esterified with a long-chain fatty acid. However, in this modified resin, it is a secondary hydroxyl group having a poor reactivity that reacts with a crosslinking agent, and the number of the hydroxyl groups is reduced as a result of the esterification.

There has also been known a method in which the terminal epoxy groups of an epoxy resin is modified with a polyester polyol, polycaprolactone polyol or a polyamide resin having a flexibility and the modified resin is used for the electrostatic coating. Also in this case, however, it is the secondary hydroxyl group which is poor in the reactivity that is used for the crosslinking reaction. Furthermore, since such secondary hydroxyl groups are directly bonded to the rigid skeleton of the epoxy resin, the reactivity with a crosslinking agent is further reduced.

The resin obtained according to the present invention is distinguished from the conventional epoxy resins in that ε-caprolactone which is bonded to the hydroxyl group of the epoxy resin by ring-opening polymerization is present as a side chain and imparts a flexibility to the epoxy resin and a primary hydroxyl group which is rich in the reactivity is present at the end of the soft side chain separate from the rigid skeleton. Furthermore, since all or parts of the epoxy groups are ring-opened by an amine, when the resin is mixed with a curing agent, a good storage stability can be obtained, and because of the presence of nitrogen atoms, the corrosion resistance and adhesion can be improved. Moreover, the hydroxyl group concentration in the resin can optionally be adjusted by using an appropriate amine, for example, an alkanol amine. If these amino groups are neutralized with an acid, the resin can be rendered water-soluble and the neutralized resin can be used as a water-soluble paint or cationic electrostatic coating paint. Still further, if the epoxy resin of the present invention is reacted with an acid anhydride to introduce a carboxyl group in the form of a half ester, the reactivity with a melamine resin is enhanced and a melamine baking paint can be provided. Still in addition, an anionic water-soluble resin or anionic electrostatic coating paint can be provided by neutralizing the carboxyl group with an amine.

As will be apparent from the foregoing description, according to the present invention, the application range of an epoxy resin can be broadened in the field of coating and furthermore, since the crosslinking reaction with a melamine resin or isocyanate can be advanced at a temperature lower than the temperature heretofore adopted and the crosslining density can be increased, a high energy-saving effect can be attained in the field of coating.

As the primary or secondary amine to be reacted with all or parts of both the terminal groups of the $\epsilon$-caprolactone-modified epoxy resin, there are preferably used amines or alkanol amines represented by the formula $H_xNR_y$ in which H stands for a hydrogen atom, N stands for a nitrogen atom, R stands for an alkyl group, an aromatic group, an alicyclic group or a hydroxyl group-containing alkyl group, x is 1 or 2, and y is 1 or 2. For example, there can be mentioned dimethyl amine, diethyl amine, methylethyl amine, dipropyl amine, propylethyl amine, butylethyl amine, dibutyl amine, dipentyl amine, dihexyl amine, ethylcyclohexyl amine, dioctyl amine, didodecyl amine, diethanol amine, di-n-propanol amine, diisopropanol amine and di-2-hydroxydodecyl amine. Furthermore, there may be used aromatic group-substituted amines such as benzylmethyl amine, benzylethyl amine, benzylethanol amine, benzylpropanol amine and dibenzyl amine. The reaction between the $\epsilon$-caprolactone-modified epoxy resin and the amine may be carried out at 80° to 200° C., preferably 100° to 180° C.

The reaction may be carried out in the absence of a solvent or in a solvent having no active hydrogen, such as toluene or xylene.

Since the resin of the present invention contains a hydroxyl group, a carboxyl group can be introduced into the resin by reacting it with a polybasic acid or polybasic acid anhydride. As the acid, there may be used maleic anhydride, succinic anhydride, phthalic anhydride, trimellitic anhydride and hexahydrophthalic anhydride. When the resin of the present invention is mixed with a melamine resin and used as a baking paint, it is preferred that the carboxyl group be introduced so that the acid value is 2 to 50KOH mg/g, especially 5 to 30KOH mg/g. A resin having an acid value of 20 to 50KOH mg/g may be used as an anionic type water-soluble resin paint in various fields after it has been neutralized with a basic substance such as an amine or caustic soda. Moreover, if the nitrogen atom contained in the resin of the present invention is neutralized with an organic acid, the resin can be converted to a cationic water-soluble resin and used for a cationic electrostatic coating paint.

Since the resin of the present invention has a primary hydroxyl group having a high activity, the resin of the present invention can be used as a baking paint by combining it with a melamine resin or amino resin or as a room temperature-drying or baking curing paint by combining it with an isocyanate or blocked isocyanate.

Moreover, the resin of the present invention may be used for the modification of coating compositions by incorporating it into a polyester resin, an acrylic resin, a cellulose resin such as nitrocellulose or cellulose acetate butyrate, a vinyl chloride resin, a petroleum resin or an alkyd resin.

PREFERRED EMBODIMENTS OF THE INVENTION

The invention will be illustrated in reference to examples. Examples 1 to 9 concern the $\epsilon$-caprolactone-modified epoxy resin. Application Examples 1 to 8 concern coating of the modified epoxy resin. Composition Examples 1 and 2 concern the composition comprising the modified epoxy resin, a carboxylic acid anhydride and a promoter for curing. Composition Examples 3 and 4 concern the composition comprising the modified epoxy resin and a polyamine. Examples 10 to 13 concern the modified epoxy resin which has been further reacted with an amine. Application Examples 9 to 12 concern coating of the modified epxoy resin which has been further reacted with an amine.

All references to parts are based on weight throughout the examples and comparative examples.

EXAMPLE 1

A four-necked flask equipped with a nitrogen-introducing tube, a thermometer, a condenser and a stirrer was charged with 1000 parts of Araldite 6097, an epoxy resin available from Ciba-Geigy Co., having a melting point of 130° C., 111 parts of $\epsilon$-caprolactone and 0.011 part of tetrabutyl titanate, and reaction was carried out at 180° C. for 5 hours to obtain a solid resin having a melting point of 81° to 85° C., a hydroxyl value of 179KOH mg/g and an epoxy equivalent of 3070.

EXAMPLES 2 THROUGH 5

In the same reaction vessel as used in Example 1. various epoxy resins were reacted at various ratios with $\epsilon$-caprolactone to obtain lactone-modified epoxy resins. The obtained results are shown in Table 1.

EXAMPLE 6

Into a four-necked flask equipped with a nitrogen introducing tube, a thermometer, a condenser, and a stirrer were charged 2000 parts of epoxy resin (Araldite GY-250, Ciba-Geigy's tradename, epoxy equivalent 180 to 190) produced from bisphenol A and epichlorohydrin, 200 parts of $\epsilon$-caprolactone, and 0.022 part of tetrabutyl titanate. Reaction was carried out under a nitrogen stream at 170° C. for 8 hours.

The quantity of unreacted $\epsilon$-caprolactone was 0.62%. The resulting resin was a viscous liquid having an epoxy equivalent of 207, a viscosity (Gardner) of $Z_4$, an acid value of 0.06, and a Gardner color scale lower than 1.

EXAMPLE 7

Into the same apparatus as used in Example 6 were charged 1800 parts of Araldite GY-250, 360 parts of $\epsilon$-caprolactone, and 0.022 part of tetrabutyl titanate. Reaction was carried out under a nitrogen stream at 170° C. for 8 hours.

The quantity of unreacted $\epsilon$-caprolactone was 0.48%. The resulting resin was a viscous liquid having an epoxy equivalent of 225, a viscosity (Gardner) of $Z_4$, an acid value of 0.05, and a Gardner color scale lower than 1.

EXAMPLE 8

Into a four-necked flask equipped with a nitrogen introducing tube, a thermometer, a condenser, and a stirrer were charged 2000 parts of epoxy resin (Araldite GY-250, Ciba-Geigy's tradename, epoxy equivalent 185) produced from bisphenol A and epichlorohydrin, 200 parts of $\epsilon$-caprolactone, and 0.022 part of tetrabutyl titanate. Reaction was carried out under a nitrogen stream at 170° C. for 8 hours.

The quantity of unreacted ε-caprolactone was 0.62%. The resulting resin was a viscous liquid having an epoxy equivalent of 210, a viscosity (Gardner) of $Z_6$, an acid value of 0.03, and a Gardner color scale lower than 1.

EXAMPLE 9

Into the same apparatus as used in Example 8 were charged 1800 parts of Araldite GY-250, 360 parts of ε-caprolactone, and 0.022 part of tetrabutyl titanate. Reaction was carried out under a nitrogen stream at 170° C. for 8 hours.

The quantity of unreacted ε-caprolactone was 0.31%. The resulting resin was a viscous liquid having an epoxy equivalent of 230, a viscosity (Gardner) of $Z_4$, an acid value of 0.05, and a Gardner color scale lower than 1.

APPLICATION EXAMPLES 1 THROUGH 8 AND COMPARATIVE EXAMPLES 1 AND 2

The lactone-modified epoxy resins and the unmodified epoxy resin were independently dissolved in ethyl monoglycol acetate, and crosslinking agents were added to the solutions so that the epoxy resin/crosslinking agent weight ratio was 90/10. Then, the coating compositions are independently coated on polished soft steel plates having a thickness of 0.3 mm, and were then dried and cured.

The following crosslinking agents were used.

(1) HMDI (hexamethylene diisocyanate) adduct (Duranate 24A-100 supplied by Asahi Kasei Kogyo K.K.)

(2) XDI (xylene diisocyanate) adduct (Takenate D-110N supplied by Takeda Yakuhin Kogyo K.K.)

(3) IPDI (isophorone diisocyanate) trimer (IPDI T-1890 supplied by Hüls Chemical Co.)

(4) Isobutylated melamine (Uban 62 supplied by Mitsui Toatsu Kagaku K.K.)

The obtained results are shown in Table 2. From the results of Comparative Examples 1 and 2, it is seen that only brittle coatings free of the flexibility can be obtained from an epoxy resin not modified with ε-caprolactone. From results of Application Examples 1 to 8, it will easily be understood that cured coatings excellent in the flexibility, adhesion and solvent resistance can be obtained from ε-caprolactone-modified epoxy resins of the present invention.

In Tables 2 and 5, the mark "⊚" indicates excellent; "o" indicates good; "Δ" indicates normal; and "x" indicates bad.

TABLE 1

| Composition | Example 2 | Example 3 | Example 4 | Example 5 |
|---|---|---|---|---|
| epoxy resin | | | | |
| Araldite 6097 (m.p. = 130° C.) | 1000 | | | |
| Araldite 6084 (m.p. = 100° C.) | | 1000 | | |
| Araldite 6071 (m.p. = 70° C.) | | | 2250 | 2000 |
| ε-caprolactone | 250 | 111 | 250 | 500 |
| tetrabutyl titanate | 0.0125 | 0.011 | 0.025 | 0.025 |
| Reaction Conditions | | | | |
| reaction temperature (°C.) | 180 | 180 | 170 | 170 |
| reaction time (hours) | 4 | 4 | 5 | 6 |
| Properties | | | | |
| melting point (°C.) | 61–65 | 67–73 | 33–36 | below 30 |
| hydroxyl value (KOH mg/g) | 166 | 192 | 215 | 190 |
| epoxy equivalent | 3910 | 1630 | 544 | 608 |

TABLE 2

| | Application Example 1 | Application Example 2 | Application Example 3 | Application Example 4 | Application Example 5 |
|---|---|---|---|---|---|
| Composition | | | | | |
| epoxy resin | Example 1 | Example 2 | Example 3 | Example 4 | Example 5 |
| crosslinking agent | HMDI adduct | HMDI adduct | HMDI adduct | HMDI adduct | HMDI adduct |
| Curing Conditions | | | | | |
| temperature (°C.) | 80 | 80 | 80 | 80 | 80 |
| time (minutes) | 120 | 120 | 120 | 120 | 120 |
| Properties of Coatings | | | | | |
| pencil hardness (Mitsubishi Uni) | HB | H | HB | B | B |
| square cut adhesion | 100/100 | 100/100 | 100/100 | 100/100 | 100/100 |
| impact resistance 500 g (cm) | 50 | 50 | 30 | 20 | 50 |
| Erichsen value (mm) | 8 | above 9 | above 9 | above 9 | above 9 |
| bending resistance (2mm) | | | X | | |
| alkali resistance (25° C., 5% NaOH, 48 hours) | | | | | |
| acid resistance (25° C., 5% HCl, 48 hours) | | | | | |
| water resistance (50° C., 48 hours) | | | | | |
| whitening | not | not | observed | observed | not |
| blister | not | not | not | observed | not |
| square cut adhesive cellophane tape | 100/100 | 30/100 | 100/100 | 100/100 | 100/100 |
| solvent resistance (xylene) | | | Δ | | |

| | Comparative Example 1 | Application Example 6 | Application Example 7 | Application Example 8 | Comparative Example 2 |
|---|---|---|---|---|---|
| Composition | | | | | |
| epoxy resin | Araldite 6084 | Example 2 | Example 2 | Example 2 | Araldite 6084 |

TABLE 2-continued

| crosslinking agent | HMDI adduct | XDI adduct | IPDI trimer | isobutylated melamine | isobutylated melamine |
|---|---|---|---|---|---|
| Curing Conditions | | | | | |
| temperature (°C.) | 80 | 80 | 80 | 150 | 150 |
| time (minutes) | 120 | 120 | 120 | 20 | 20 |
| Properties of Coatings | | | | | |
| pencil hardness (Mitsubishi Uni) | H | H | 2H | HB | H |
| square cut adhesion | 0/100 | 100/100 | 100/100 | 100/100 | 90/100 |
| impact resistance 500 g (cm) | 10 | 50 | 50 | 50 | 10 |
| Erichsen value (mm) | 3 | above 9 | above 9 | 8 | 3 |
| bending resistance (2mm) | X | | | | X |
| alkali resistance (25° C., 5% NaOH, 48 hours) | | | | | |
| acid resistance (25° C., 5% HCl, 48 hours) | | | | | |
| water resistance (50° C., 48 hours) | | | | | |
| whitening | observed | observed | not observed | observed | observed |
| blister | observed | observed | not | not | not |
| square cut adhesive cellophane tape | 100/100 | 0/100 | 0/100 | 100/100 | 0/100 |
| solvent resistance (xylene) | X | | | | X |

COMPOSITION EXAMPLE 1

Fifty parts of the lactone-modified epoxy resin prepared in Example 6 was blended with 36.5 parts of methyltetrahydrophthalic anhydride ("Rikasid MH-700, made by Shin-Nippon Rika Co., Ltd.) and 0.43 part of benzyldimethylamine as a catalyst. After precuring at 100° C. for 2 hours, the compound was cured at 160° C. for 5 hours. Table 3 shows the heat distortion temperature, elongation at break, and breaking strength of the cured resin.

COMPOSITION EXAMPLE 2

Fifty parts of the lactone-modified epoxy resin prepared in Example 7 was blended with 33.6 parts of methyltetrahydrophthalic anhydride and 0.42 part of benzyldimethylamine as a catalyst. The compound was cured under the same conditions as in Composition Example 1. The properties of the cured resin are shown in Table 3.

COMPARATIVE EXAMPLE 3

A composition was prepared by blending 50 parts of unmodified epoxy resin Araldite GY-250 with 40.9 parts of methyltetrahydrophthalic anhydride and 0.45 part of benzyldimethyl amine. The composition was cured under the same conditions as in Composition Example 1. Properties of the cured resin are shown in Table 3.

COMPARATIVE EXAMPLE 4

A composition was prepared by blending 50 parts of unmodified epoxy resin Araldite GY-250 with 40.9 parts of methyltetrahydrophthalic anhydride, 12.5 parts of polycaprolactone triol ("Placsel 308" made by Daicel Chemical Industry Co., Ltd.) as a catalyst, and 0.52 part of benzyldimethyl amine. The composition was cured under the same conditions as in Composition Example 1. Properties of the cured resin are shown in Table 3. As shown in Composition Examples 1,2 and Comparative Examples 3,4, the curable composition of lactone-modified epoxy resin of this invention has not only outstanding flexibility but also heat distortion temperature which is higher than that of a composition prepared by simply adding a flexibilizer.

TABLE 3

| | Composition Example 1 | Composition Example 2 | Comparative Example 3 | Comparative Example 4 |
|---|---|---|---|---|
| Formulation (parts by weight) | | | | |
| Epoxy resin | Example 6 50 | Example 7 50 | Araldite GY-250 50 | Araldite GY-250 50 |
| Acid anhydride | Rikasid MH-700 36.5 | Rikasid MH-700 33.6 | Rikasid MH-700 40.9 | Rikasid MH-700 40.9 |
| Flexibilzier | — | — | — | PLACCEL 308 12.5 |
| Catalyst | Benzyldimethyl amine 0.43 | Benzyldimethyl amine 0.42 | Benzyldimethyl amine 0.45 | Benzyldimethylamine 0.52 |
| Properties of cured resin | | | | |
| Heat distortion temperature (°C.) | 113 | 93 | 131 | 88 |
| Breaking strength (kg/cm²) | 7.52 | 7.10 | 8.09 | 6.82 |
| Elongation at break (%) | 6.62 | 6.45 | 6.86 | 5.83 |

COMPOSITION EXAMPLE 3

One hundred parts of the lactone-modified epoxy resin prepared in Example 8 was blended with 25.8 parts of diaminodiphenylmethane (abbreviated as DDM hereinafter). After precuring at 130° C. for 2 hours, the compound was cured at 150° C. for 4 hours. Table 4 shows the heat distortion temperature, impact strength, elongation at break, and breaking strength of the cured resin.

COMPOSITION EXAMPLE 4

One hundred parts of the lactone-modified epoxy resin prepared in Example 9 was blended with 22.8 parts of DDM, and the compound was cured under the same conditions as in Composition Example 3. Properties of the cured resin are shown Table 4.

COMPARATIVE EXAMPLE 5

A composition was prepared by blending 100 parts of unmodified epoxy resin Araldite GY-250 with 28.3 parts of DDM, and was cured under the same conditions as in Composition Example 3. Properties of the cured resin are shown in Table 4.

COMPARATIVE EXAMPLE 6

A composition was prepared by blending 100 parts of unmodified epxoy resin Araldite GY-250 with 28.3 parts of DDM, and 10 parts of polycaprolactone triol ("Placsel 308" made by Daicel Chemical Industry Co., Ltd.) as a flexibilizer. The composition was cured under the same conditions as in Composition Example 3. Properties of the cured resin are shown in Table 4.

COMPARATIVE EXAMPLE 7

A composition was prepared by blending 100 parts of unmodified epoxy resin Araldite GY-250 with 28.3 parts of DDM, and 20 parts of "Placsel 308" as a flexibilizer. The composition was cured under the same conditions as in Composition Example 3. Properties of the cured resin are shown in Table 4. As shown in Composition Examples 3, 4 and Comparative Examples 5, 6, 7, the curable composition of lactone-modified epoxy resin of this invention has not only outstanding flexibility but also heat distortion temperature which is higher than that of a composition prepared by simply adding a flexibilizer.

TABLE 4

|  | Composition Example 3 | Composition Example 4 | Comparative Example 5 | Comparative Example 6 | Comparative Example 7 |
|---|---|---|---|---|---|
| Formulation (parts by weight) |  |  |  |  |  |
| Resin of Example 6 | 100 |  |  |  |  |
| Resin of Example 7 |  | 100 |  |  |  |
| Araldite GY-250 |  |  | 100 | 100 | 100 |
| Placcel 308 |  |  |  | 10 | 20 |
| DDM | 25.8 | 22.8 | 28.3 | 28.3 | 28.3 |
| Properties of cured resin |  |  |  |  |  |
| Heat distortion temperature (°C.) | 122 | 90 | 166 | 124 | 97 |
| Tensile strength (kgf/mm$^2$) | 7.3 | 7.6 | 7.0 | 6.4 | 7.0 |
| Tensile elongation (%) | 4.8 | 3.9 | 5.7 | 3.0 | 3.6 |
| Impact strength (Izod with notch) (kgf · cm/cm$^2$) | 4.0 | 3.5 | 3.8 | 3.9 | 3.3 |

EXAMPLE 10

A four-necked flask equipped with a thermometer, a nitrogen-introducing tube, a stirrer and a cooler was charged with 720 parts of Epitote YD-011 (bisphenol type epoxy resin supplied by Toto Kasei K.K. and having an epoxy equivalent of 450 to 500), 547 parts of ε-caprolactone and 0.013 part of tetrabutyl titanate as the catalyst, and reaction was carried out in a nitrogen current at 170° C. for 8 hours and when the amount of residual ε-caprolactone was 0.3%, the reaction mixture was cooled to 140° C. Then, 168 parts of diethanol amine was added and reaction was carried out at 140° to 150° C. for 1 hour. Then, 38 parts of phthalic anhydride was added to the reaction mixture and the mixture was heated at 150° C. for 1 hour to complete the reaction. The reaction mixture was diluted with xylene. The obtained resin solution had a nonvolatile component content of 70.2%, a Gardner viscosity of Z$_5$, a hue of 2, an acid value of 5.6 and a hydroxyl value of 168.

EXAMPLE 11

The same reaction vessel as used in Example 10 was charged with 800 parts of Araldite 6084 (bisphenol type epoxy resin supplied by Ciba-Geigy Co. and having an epoxy equivalent of 900 to 1000), 200 parts of ε-caprolactone and 0.01 part of tetrabutyl titanate as the catalyst, and reaction was carried out at 175° C. for 5 hours. The reaction mixture was cooled to 140° C. and 91.3 parts of diethanol amine was added, and reaction was carried out at 140° C. for 1 hour. Then, 14.4 parts of phthalic anhydride was added to the reaction mixture, and the mixture was heated at 140° C. for 1 hour to complete the reaction. The reaction product was dissolved in a 50/50 mixed solvent of xylene and ethylene glycol monoethyl ether acetate to obtain a resin solution having a nonvolatile component content of 51.2%, an acid value of 2.01, a hydroxyl value of 129.2 and a Gardner viscosity of S-T (25° C.).

EXAMPLE 12

The same reaction vessel as used in Example 10 was charged with 720 parts of Araldite 6071 (bisphenol type epoxy resin supplied by Ciba-Geigy Co. and having an epoxy equivalent of 450 to 500), 342 parts of ε-caprolactone and 0.01 part of tetrabutyl titanate as the catalyst, and reaction was carried out at 170° C. for 4 hours. The reaction mixture was cooled to 140° C. and 168 parts of diethanol amine was added, and reaction was carried out at 140° C. for 1 hour. The reaction product was dissolved in a 50/50 mixed solvent of xylene and ethylene glycol monoethyl ether acetate to obtain a resin solution having a nonvolatile component content of 60.1%, an acid value of 1.2, a hydroxyl value of 177, a Gardner viscosity of Z$_3$ (25° C.) and a hue of 1.

EXAMPLE 13

The same reaction vessel as used in Example 10 was charged with 700 parts of Araldite 6084, 300 parts of ε-caprolactone and 0.01 part of tetrabutyl titanate, and reaction was carried out at 170° C. for 6 hours. The reaction mixture was cooled to 140° C. and 80 parts of diethanol amine was added, and reaction was carried out at 140° C. for 1 hour to complete the reaction. The reaction product was dissolved in a 50/50 mixed solvent of xylene and ethylene glycol monoethyl ether acetate to obtain a resin solution having a nonvolatile component content of 50.5%, an acid value of 0.3, a hydroxyl value of 115 and a Gardner viscosity of P-Q.

APPLICATION EXAMPLES 9 TO 12 AND COMPARATIVE EXAMPLES 8,9

Coating compositions prepared by mixing the resins of the present invention obtained in Examples 10 to 13 respectively and the conventional epoxy resin with curing agents were independently coated on polished soft steel plates having a thickness of 0.3 mm and the coated compositions were dried and cured to obtain cured coatings having a thickness of about 50 to about 70μ.

The following curing agents were used.

(1) HMDI (hexamethylene diisocyanate) adduct (Duranate 24A-100 supplied by Asahi Kasei Kogyo K.K.)

(2) n-Butylated melamine (Uban 20SE supplied by Mitsui Toatsu Kagaku K.K.)

The properties of the coatings are shown in Table 5.

1. A lactone-modified epoxy resin which is the reaction product obtained by effecting ring-opening polymerization of from 3 to 95 parts by weight of ε-caprolactone, in the presence of from 97 to 5 parts by weight of an epoxy resin having terminal unreacted epoxy groups and having at least one hydroxyl group in the epoxy resin molecule, at a temperature of from 100° to 240° C., in the presence of a catalytically effective amount of a catalyst effective for polymerizing ε-caprolactone and selected from the group consisting of titanium compounds, organotin compounds and stannous halides, the conditions being effective to form poly(ε-caprolactone) as a side chain bonded to the epoxy resin molecule at the location of said hydroxyl group or groups, said poly(ε-caprolactone) side chain having a terminal primary hydroxyl group at the end thereof remote from said epxoy resin molecule.

2. A lactone-modified epoxy resin as claimed in claim 1 in which the amount of ε-caprolactone is from 5 to 70 parts by weight and the amount of said epoxy resin is from 95 to 30 parts by weight, and in which the polymerization is performed at a temperature of from 120° to 200° C., in the presence of a catalytically effective amount of a catalyst selected from the group consisting of tetrabutyl titanate, tetrapropyl titanate, tetraethyl titanate, stannous octoate, dibutyltin oxide, dibutyltin laurate, stannous chloride, stannous bromide and stannous iodide.

3. A lactone-modified epoxy resin as claimed in claim

TABLE 5

| | | Properties of Coatings | | | | | |
|---|---|---|---|---|---|---|---|
| | | Application Example 9 | Application Example 10 | Application Example 11 | Application Example 12 | Comparative Example 8 | Comparative Example 9 |
| Composition | resin | Example 10 | Example 11 | Example 12 | Example 13 | Araldite 6084 | Araldite 6084 |
| | Curing agent | Uban 20SE | Duranate 24A-100 | Duranate 24A-100 | Duranate 24A-100 | Duranate 24A-100 | Uban 20SE |
| | resin/curing agent ratio | 70/30 (weight ratio) | 1/0.3 (OH/NCO) | 1/0.3 (OH/NCO) | 1/0.3 (OH/NCO) | 1/0.3 (OH/NCO) | 70/30 (weight ratio) |
| Curing Conditions | temperature (°C.) | 120 | 25 | 25 | 25 | 25 | 120 |
| | time | 30 (minutes) | 7 (days) | 7 (days) | 7 (days) | 7 (days) | 7 (days) |
| Properties of Coatings | pencil hardness (Mitsubishi Uni) | HB | H | H | HB | H | H |
| | square cut adhesion | 100/100 | 100/100 | 100/100 | 100/100 | 0/100 | 90/100 |
| | impact resistance 500 g (cm) | 50 < | 50 < | 50 < | 50 < | 10 | 10 |
| | Erichsen value (mm) | 8.9 | 9.0 | 8.7 | 9.0 | 3 | 3 |
| | bending resistance (2 mm) | good | good | good | good | bad | bad |
| | water resistance (40° C., 100 hours) | | | Δ | | X | X |
| | salt spray resistance (35° C., 150 hours) | | | | | Δ | Δ |
| | stain resistance | | Δ | | Δ | | |
| | solvent resistance alkali resistance | | | | | X | Δ |

The embodiments of the invention in which an exclusive property or privilege is claimed are defined as follows:

1 in which said epoxy resin is selected from the group consisting of

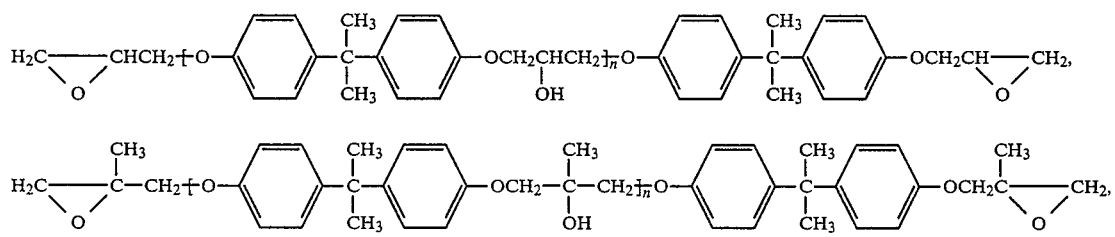

a flame retardant epoxy resin which is produced from 2,6-dibromobisphenol A and epichlorohydrin or β-methylepichlorohydrin,

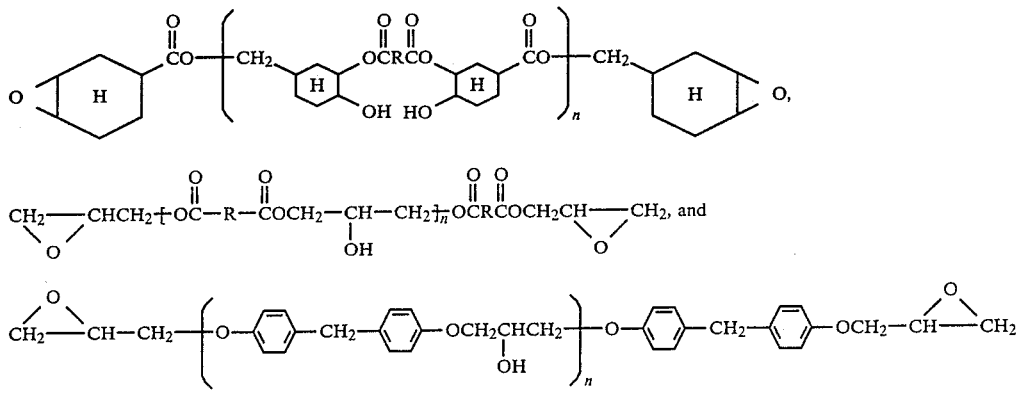

wherein n is a number of at least 1 and R is an alkylene group or a divalent aromatic group.

4. A curable epoxy resin composition which comprises a blend of a lactone-modified epoxy resin as claimed in claim 1, a polycarboxylic acid anhydride and a curing promoter.

5. A curable epoxy resin composition as claimed in claim 4 in which the amount of said polycarboxylic acid anhydride is from 0.5 to 10 equivalent, per one equivalent of epoxy groups in said lactone-modified epoxy resin.

6. A curable epoxy resin composition as claimed in claim 5 in which said polycarboxylic acid anhydride is selected from the group consisting of phthalic anhydride, tetrahydrophthalic anhydride, methyltetrahydrophthalic anhydride, hexahydrophthalic anhydride, methylhexahydrophthalic anhydride, methyl nadic anhydride, chlorendic anhydride, trimellitic anhydride, pyromellitic anhydride and dodecenyl succinic anhydride.

7. A curable epoxy resin composition as claimed in claim 5 in which the amount of said curing promoter is from 0.05 to 5.0 parts by weight, per 100 parts by weight of said lactone-modified epoxy resin.

8. A curable epoxy resin composition as claimed in claim 6 in which the amount of said curing promoter is from 0.05 to 5.0 parts by weight per 100 parts by weight of said lactone-modified epoxy resin, and said curing promoter is selected from the group consisting of benzyldimethylamine, benzyldiethylamine, cyclohexyldimethylamine and tris(dimethylaminomethyl)phenol.

9. A curable epoxy resin composition which comprises a blend of a lactone-modified epoxy resin as claimed in claim 1, and a polyamine.

10. A curable epoxy resin composition as claimed in claim 9 in which the amount of said polyamine is from 0.1 to 3.0 equivalents, per one equivalent of epoxy groups in said lactone-modified epoxy resin.

11. A curable epoxy resin composition as claimed in claim 10 in which said polyamine is selected from the group consisting of ethylenediamine, diethylenetriamine, triethylenetetramine, menthenediamine, m-xylylenediamine, N-aminoethylpiperazine, m-phenylenediamine, diaminophenylmethane, diaminodiphenylsulfone, melamine resin, urea resin and imidazole amino acid.

* * * * *